(No Model.) 2 Sheets—Sheet 2.

A. C. BRANTINGHAM.
GRAIN HEATER AND STEAMER.

No. 547,597. Patented Oct. 8, 1895.

WITNESSES:
H. D. Nealy
J. A. Walsh

INVENTOR
Allen C. Brantingham,
BY Chester Bradford,
ATTORNEY.

UNITED STATES PATENT OFFICE.

ALLEN C. BRANTINGHAM, OF TOLEDO, OHIO, ASSIGNOR TO THE NORDYKE & MARMON COMPANY, OF INDIANAPOLIS, INDIANA

GRAIN HEATER AND STEAMER.

SPECIFICATION forming part of Letters Patent No. 547,597, dated October 8, 1895.

Application filed February 14, 1895. Serial No. 538,331. (No model.)

*To all whom it may concern:*

Be it known that I, ALLEN C. BRANTINGHAM, a citizen of the United States, residing at Toledo, in the county of Lucas and State of Ohio, have invented certain new and useful Improvements in Grain Heaters and Steamers, of which the following is a specification.

The object of my present invention is to produce an efficient grain heater and steamer and to provide means whereby the flow of grain through it may be accurately adjusted and other means whereby said flow may be automatically stopped under certain circumstances.

A heater embodying my said invention will be first fully described, and the novel features thereof then pointed out in the claims.

Figure 1:
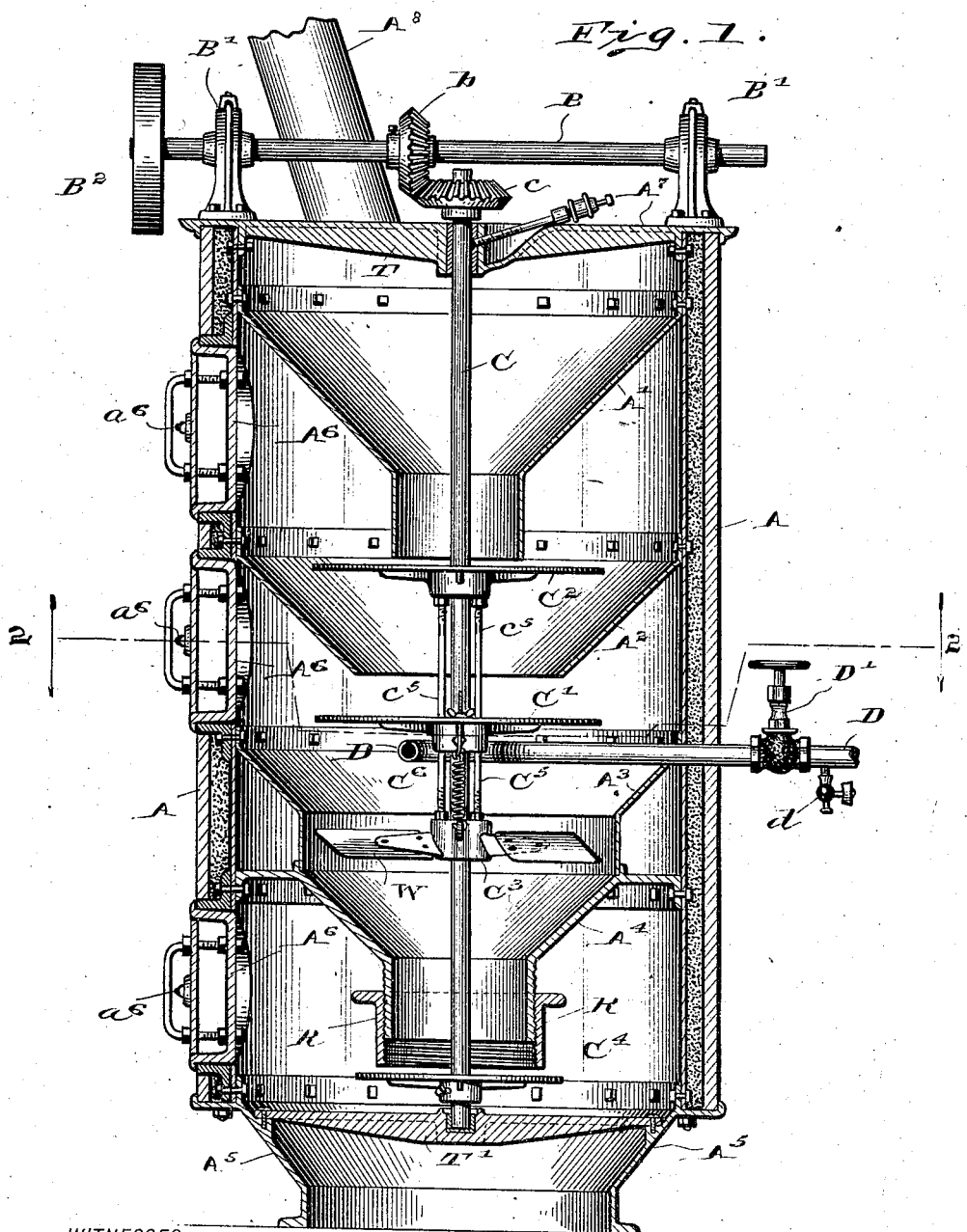
Figure 2:
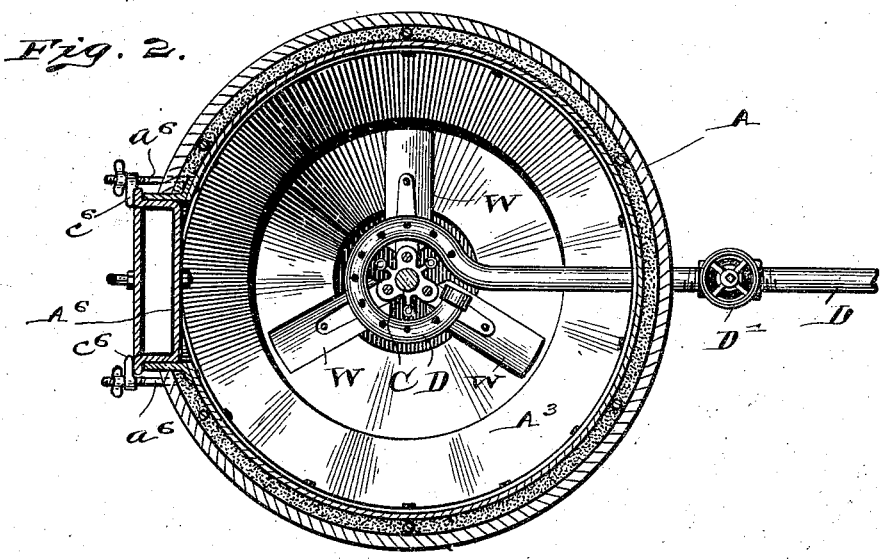
Figure 3:
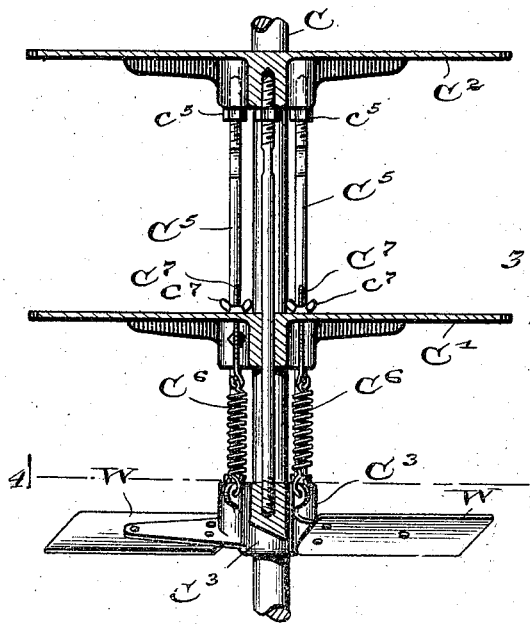
Figure 4:
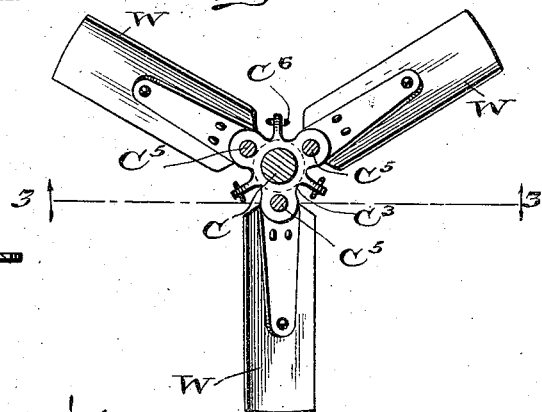

Referring to the accompanying drawings, which are made a part hereof, and on which similar letters of reference indicate similar parts, Figure 1 is a central vertical sectional view through the structure of one of my improved heaters, showing the mechanism in elevation; Fig. 2, a horizontal sectional view looking downwardly from the dotted line 2 2 in Fig. 1; Fig. 3, a detail view, on an enlarged scale, as seen from the dotted line 3 3 in Fig. 4; and Fig. 4, a detail horizontal sectional view looking downwardly from the dotted line 4 4 in Fig. 3.

In said drawings the portions marked A represent the casing of my improved heater; B, the driving-shaft thereto; C, the shaft which extends vertically through said heater; and D a steam-pipe which enters said heater, through which moisture and heat are supplied thereto.

The casing A is preferably cylindrical in general outline and contains several hopper-shaped portions $A'$ $A^2$ $A^3$ $A^4$ and terminates at the bottom in the hopper-shaped portion $A^5$. Access is provided to the chambers or open spaces between said hoppers and the interior surface of the cylindrical casing by means of openings formed in the sides of said casing, and which are provided with covers or stoppers $A^6$, which are generally and preferably secured in place by bolts $a^6$, having appropriate adjustable engaging-arms $c^6$. The walls of the heater are preferably made double and packed with some substantially non-heat-conducting material, as shown, for the purpose of maintaining substantial uniformity of temperature in the interior of said heater. Entering or connected with a perforation in the top $A^7$ is an egress-spout $A^8$, through which the grain is introduced into the heater.

The lower hopper $A^4$ is provided with an adjustable ring R, which forms an extension to the nozzle or discharging point therefor, and which is screw-threaded and passes over the ordinary fixed nozzle or discharging point. This ring R reaches down to the desired distance from the disk $C^4$, and the size of the discharging-orifice between its lower edge and the upper surface of said disk may be accurately adjusted, as desired, by merely revolving said ring, as will be readily seen.

The driving-shaft B is preferably mounted transversely of the heater in bearings $B'$, secured to the top of the heater structure, and is driven by a belt running on a pulley $B^2$ thereon from some suitable source of power. (Not shown.) Centrally it is provided with a bevel-pinion $b$, which engages with a corresponding bevel-pinion $c$ on the upper end of the shaft C.

The shaft C is mounted vertically in suitable bearings in the bridge-trees T and $T'$ at the top and bottom of the heater structure, respectively, and is driven by the gears already described from the driving-shaft B. It carries a disk $C'$, which is fixedly mounted thereon, a disk $C^2$, which is so mounted as to be revolved by the shaft, but free to move longitudinally of the shaft, and the winged head $C^3$, through which the longitudinal movement of the disk $C^2$ is secured, as will be presently more fully described. The disk $C^2$ receives the discharge of grain from the first hopper $A'$, and said grain is spread out over and discharged from said disk by centrifugal force, as will be readily understood, and thence falls into the hopper $A^2$. From the hopper $A^2$ it descends onto the disk $C'$, which imparts a similar movement to it, and it thence falls into the hopper $A^3$ and thence down past the winged hub $C^3$ to the hopper $A^4$, whence it discharges finally onto the disk $C^4$, which imparts a similar movement to it as the disks already described, from whence it finally falls into the hopper $A^5$ and is thence led off to the next machine by which the grain is to be treated. By means of the repeated distributions of the grain under the centrifugal action of the several disks C', C², and C⁴, said grain is thoroughly mixed and turned and commingled, so that it receives even dampening and heating while passing through the apparatus and is discharged in a perfectly uniform condition.

As sometimes the requirements of the subsequent machines are not equal to the capacity of the heater, it is desirable that means should be provided whereby the flow may be automatically checked or cut off under such circumstances. As before stated, the disk C' is fixedly secured to the shaft C. Through this disk extend the rods C⁵, which connect the disk C² to the hub C³, and thus when one of these parts is moved longitudinally of the shaft the other is simultaneously and correspondingly moved. As will be observed, the hub C³ is provided with inclined wings W, which revolve among and over the grain in the hopper A⁴, the inclination being such relatively to the rotation of the shaft that their advance edges are their higher edges. Should it happen, therefore, that the supply of grain from the heater is greater than the capacity of the succeeding machine to handle, and the grain therefore be backed up so as to fill said hopper A⁴, the operation would be that these inclined wings traveling over the mass of grain would operate through the rod C⁵ to raise the disk C², and thus close the discharge-orifice of the hopper A', which would stop the flow of grain until the supply already treated had become reduced and the orifice permitted to open again. The disk C² therefore serves the double purpose of distributing the grain as it comes from the hopper A' and of a gate for said hopper under the circumstances described. In order that the discharge of grain from the hopper A' under ordinary circumstances may be adjusted and the resistance of the disk C² to the mass of grain coming upon it be sufficient to properly support its weight, I have provided the springs C⁶, which connect with the rigidly-fixed disk C' and the hub C³, thus supporting said hub and through the rods C⁵ also supporting the disk C². Thumb-nuts c⁷ upon eyebolts C⁷, connected to said springs, form a ready means of adjustment therefor. The rods C⁵ are preferably screw-threaded at one or both ends, as shown, so that the distance between the hub C³ and the disk C² can be adjusted also, when desired, and said rod C⁵ may be further provided with adjusting-nuts c⁵, if desired, as shown.

The pipe D is an ordinary steam-pipe. At its inner end it preferably makes a turn, as shown most plainly in Fig. 2, and has perforations in its upper side preferably immediately below the disk C'. The steam entering through this pipe and discharging through these perforations comes in contact with the under side of this disk and is thus scattered in all directions. An ordinary valve D' is provided for the usual purpose of such valves, and also preferably a drip-cock d for the purpose of discharging any condensed steam that may accumulate before opening the valve D'.

Having thus fully described my said invention, what I claim as new, and desire to secure by Letters Patent, is—

1. The combination, in a grain heater, of a casing, hoppers in said casing, a vertical shaft extending through said hoppers, disks on said shaft below the mouths of said hoppers to receive the discharge of grain therefrom, that disk which is below one of the upper hoppers being movable longitudinally of said shaft, and thus adapted to serve also as a gate for said hopper, a hub near the lower end of the structure provided with inclined wings, and rods extending from said hub to said disk, whereby, when the grain in the lower end of structure becomes checked, said wings will operate thereon to raise and close said gate.

2. The combination, in a grain heater and steamer, of a casing, hoppers in said casing, a shaft extending vertically through said hoppers, flat imperforate disks on said shaft, and a steam pipe extending in through the casing to a point directly below one of said disks, and provided with perforations directed toward the adjacent surface of said disk, through which the steam will escape against said surface, and be thus distributed outwardly, in a sheet, after heating said disk, substantially as shown and described.

3. The combination, in a grain heater, of a casing, hoppers therein, a shaft extending vertically through said hoppers and provided with a flat disk below each of said hoppers on to which the grain will fall therefrom, and be thence discharged by centrifugal force, mechanism governed by the grain passing through the heater whereby the flow of said grain is automatically controlled, and a steam pipe leading into the central portion of said grain heater below one of said disks and there provided with fine orifices for the discharge of steam, said several parts being arranged and operating substantially as shown and described, and for the purposes specified.

In witness whereof I have hereunto set my hand and seal, at Toledo, Ohio, this 9th day of February, A. D. 1895.

ALLEN C. BRANTINGHAM [L. S.]

Witnesses:
M. W. PLATT,
GEO. J. RUDD.